United States Patent [19]

Carimali et al.

[11] Patent Number: 5,297,387
[45] Date of Patent: Mar. 29, 1994

[54] DEFLECTOR EDGE FOR A THRUST REVERSER

[75] Inventors: Félix Carimali; Michel J. L. Legras, both of Le Havre, France

[73] Assignee: Societe Hispano-Suiza, Saint Cloud Cedex, France

[21] Appl. No.: 931,355

[22] Filed: Aug. 18, 1992

[30] Foreign Application Priority Data

Aug. 21, 1991 [FR] France ................. 91 10475

[51] Int. Cl.⁵ .............................. F02K 3/02
[52] U.S. Cl. ..................... 60/226.2; 60/230; 244/110 B; 239/265.29
[58] Field of Search ............ 60/226.2, 230, 232; 244/110 B; 239/265.29

[56] References Cited

U.S. PATENT DOCUMENTS

| | | | |
|---|---|---|---|
| 3,599,432 | 8/1971 | Ellis | 60/230 |
| 4,000,610 | 1/1977 | Nash et al. | 60/232 |
| 4,175,385 | 11/1979 | Nash | 60/232 |
| 4,410,152 | 10/1983 | Kennedy et al. | 244/110 B |
| 4,485,970 | 12/1984 | Fournier et al. | 239/265.29 |
| 4,916,895 | 4/1990 | Dubois | 60/226.2 |
| 4,976,466 | 12/1990 | Vauchel | 239/265.29 |
| 5,046,307 | 9/1991 | Matta et al. | 60/230 |
| 5,120,004 | 6/1992 | Matthias | 60/226.2 |

FOREIGN PATENT DOCUMENTS

| | | |
|---|---|---|
| 2559838 | 8/1985 | France. |
| 638063 | 5/1950 | United Kingdom. |
| 2075447 | 11/1981 | United Kingdom. |

*Primary Examiner*—Richard A. Bertsch
*Assistant Examiner*—Howard R. Richman
*Attorney, Agent, or Firm*—Bacon & Thomas

[57] ABSTRACT

A thrust reverser for a turbofan-type turbojet engine assembly is disclosed having a deflector defining an upstream edge of a reverse thrust opening formed in the turbofan housing so as to control the direction and shape of the gases passing through the reverse thrust opening. The deflector has a deflector edge portion defining a deflector edge wherein the curvature of the deflector edge portion, as measured in a longitudinal radial plane passing radially through a longitudinal axis of the engine, varies in a direction from one side of the reverse thrust opening to the opposite side of the opening. The curvature of the deflector edge portion is defined as being positive when the center of curvature of the deflector edge portion lies radially outwardly of the deflector and is defined as being negative when the center of curvature of the deflector edge portion lies radially inwardly of the deflector. The deflector edge portion may have a positive curvature adjacent to one side of the reverse thrust opening and a negative curvature adjacent to an opposite side of the reverse thrust opening such that the deflector edge defines a continuous smooth curve from one side of the reverse thrust opening to the other side. The direction and the shape of the gases passing through the reverse thrust opening is controlled by varying the curvature of the deflector edge portion across the reverse thrust opening. The portion of the deflector edge having a positive curve of the smallest radius forms a maximum flow area, while the deflector edge portion having a negative curvature of the smallest radius forms a minimum flow area. Thus, by tailoring the curvature of the deflector edge portion to meet the requirements of a particular engine/aircraft application, the direction and shape of the gases passing through the reverse thrust opening can be controlled so as to minimize contact with the adjacent aircraft structure and to prevent reingestion of the thrust reverse gases into the turbofan engine.

8 Claims, 4 Drawing Sheets

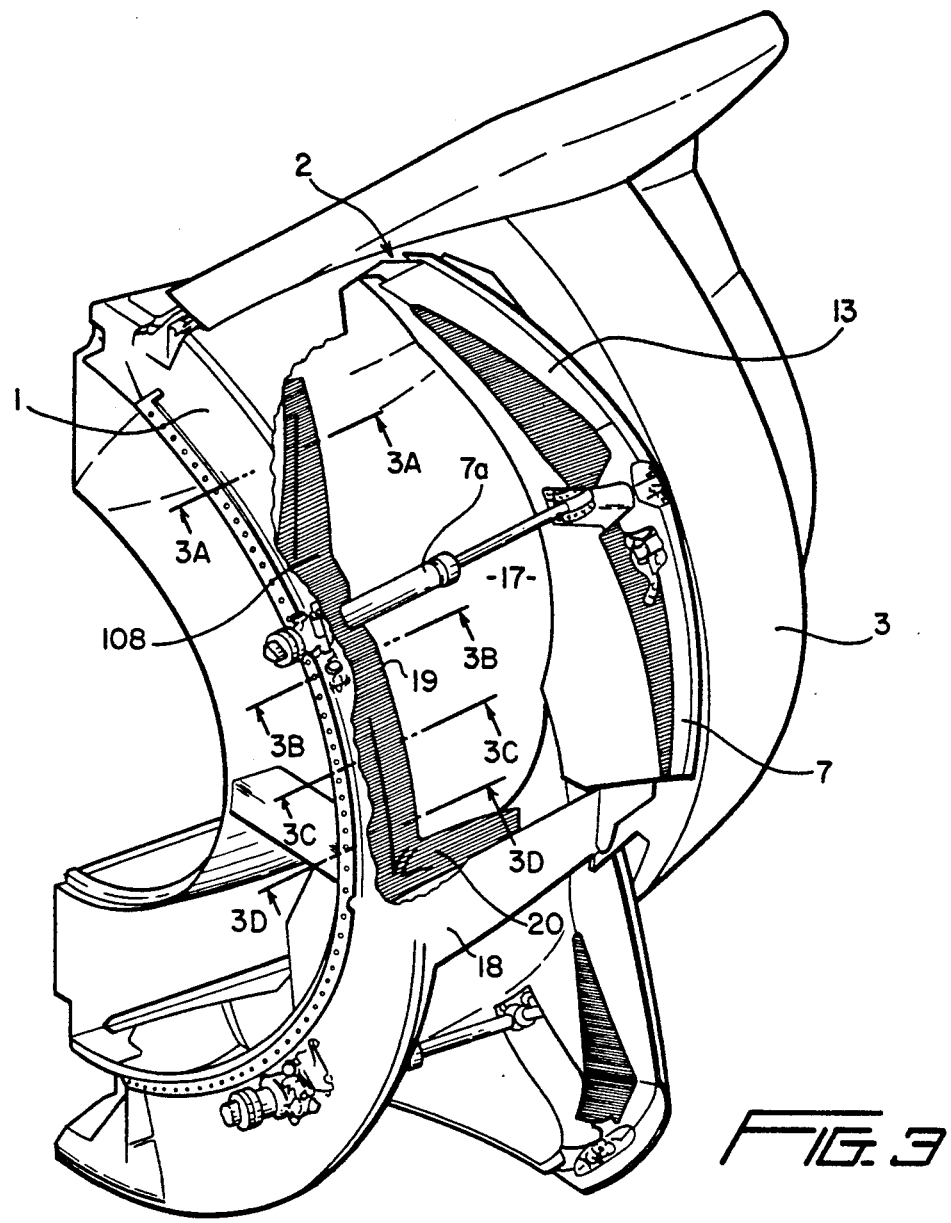
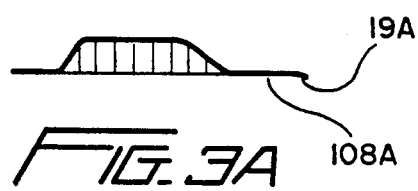  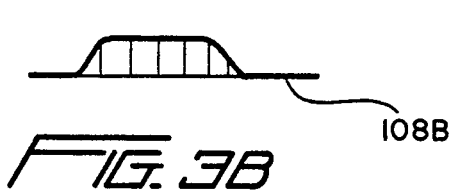
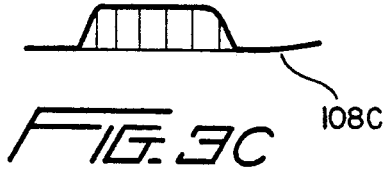 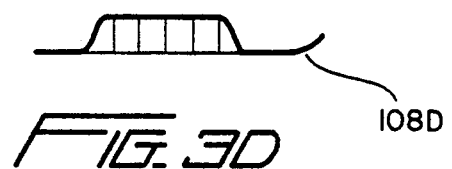

DEFLECTOR EDGE FOR A THRUST REVERSER

BACKGROUND OF THE INVENTION

The present invention relates to a thrust reverser for a turbofan-type turbojet engine, more particularly such a thrust reverser having a deflector to control the direction and shape of the gases emanating from the thrust reverser.

Turbofan engines are well-known in the art and typically comprise a turbojet engine drivingly connected to a turbofan, usually mounted on the front of the turbojet engine. A turbofan housing, radially displaced from, but generally concentric with the turbofan engine housing, defines a cold flow air duct for air driven by the turbofan. In such turbofan engines having a relatively high bypass ratio, thrust reversers are typically provided on the turbofan housing so as to redirect the air passing through the cold flow air duct during landing of the aircraft in order to provide a reverse thrust.

Thrust reversers may assume many different configurations, but a typical thrust reverser is illustrated in FIG. 1. The thrust reverser comprises a stationary, upstream portion 1 which forms a part of the turbofan housing and defines an outer boundary of a cold flow air duct, a movable portion 2 which may redirect the air passing through the cold flow duct and a stationary, downstream collar 3 which also forms a portion of the turbofan housing. The stationary upstream portion 1 typically comprises an exterior panel 4 which defines a portion of the exterior surface of the turbofan housing, an internal panel 5 which, in conjunction with the housing for the turbojet engine (not shown) defines boundaries of the cold flow air duct and a frame 6 which interconnects panels 4 and 5. The frame 6 also provides support for the actuator 7a which controls the movement of the movable portion 2 which, in this instance, comprises one or more movable thrust reversing doors 7. The number of such doors may vary depending upon the application of the turbofan engine to a particular type aircraft and typically may comprise 2, 3 or 4 such doors. The doors may be located around the circumference of the turbofan housing and, when in their deployed or thrust reversing positions, redirect the air passing through the cold flow duct to provide a thrust reversing force. When in the closed, or forward thrust position, as illustrated in FIG. 1, the exterior panel 9 of the thrust reversing door 7 is flush with the outer surface of exterior panel 4 and the exterior surface of downstream collar 3 so as to provide a smooth aerodynamic surface for the air passing, over the exterior of the turbofan housing, illustrated by arrow 10.

FIG. 2 illustrates a pair of known thrust reversing doors 7 in their deployed is positions in which the forward, or upstream, edge is displaced radially outwardly from the generally annular turbofan housing. As is well-known in the art, rear, or downstream, portions of the thrust reverser doors 7 extend inwardly into the cold flow duct so as to redirect the air outwardly through the opening in the turbofan housing in a forward direction. Each thrust reverser door 7 is operatively associated with a hydraulic jack or actuator 7a, which typically comprises a cylinder having an extendable and retractable piston rod attached to the thrust reverser door 7.

The terms "upstream" and "downstream" are defined in relation to the direction of air or gas circulation in the forward thrust mode, e.g., from the front of the turbofan engine towards the rear of the turbofan engine. The air or gas passing through the cold flow air duct, illustrated at 15 in FIG. 1, passes over the surface of internal panel 5 and over a deflector 8. Each thrust reverser door 7 has an interior door panel 11 which is connected to the exterior door panel 9 via brace 12 and a door air deflector 13. Door air deflector 13 extends radially inwardly past the surface of interior panel 11 such that, when the thrust reverser door 7 is in its thrust reversing position, door air deflector 13 will impart a more forward direction to the air passing through the opening in the turbofan housing. When in its closed, forward thrust position, the thrust reverser door 7 forms part of the boundaries of cavity 16, which is bounded by the interior door panel 11, the deflector 8, the door air deflector 13 and line 14, which represents the ideal, theoretical surface interconnecting the internal panel 5 with the interior portion of the downstream collar portion 3. Cavity 16, as is well-known in the art, creates air flow distortion and perturbations within the cold flow air duct thereby increasing aerodynamic losses and degrading engine performance in the forward thrust operating mode.

Typical pivoting door thrust reversing systems for a turbojet engine are described in U.S. Pat. Nos. 4,410,152 and 4,485,970, as well as French Patent 2,559,838. Solutions for improving the air flow through the cold flow air duct in the forward thrust operating mode ay also own in the art, a typical example of which may be found in U.S. Pat. No. 4,916,895. This patent describes a thrust reverser door having a movable internal segment such that it matches the ideal flow surface when the door is in the forward thrust position.

Another problem encountered by known turbofan thrust reversers is the controlling of the direction and the shape of the air passing through the opening in the turbofan housing. This is of particular importance where the turbofan engine is mounted close to the aircraft structure where it would prove detrimental to have the thrust reversing gases contact the adjacent aircraft structure. Such control is also important to prevent the reingestion of the thrust reversing gases by the turbofan engine. The thrust reverser in French Patent 1,559,838 provides one attempt at a solution to controlling the shape and direction of the thrust reversing gases by providing a particular orientation to the upstream edge of the thrust reverser opening and/or shaping the distal edge of door air deflector. The technique for controlling the lateral and forward deflections of the thrust reversing gases is defined as "fluid-sheet control".

SUMMARY OF THE INVENTION

A thrust reverser for a turbofan-type turbojet engine assembly is disclosed having a deflector defining an upstream edge of a reverse thrust opening formed in the turbofan housing so as to control the direction and shape of the gases passing through the reverse thrust opening. The deflector has a deflector edge portion defining a deflector edge wherein the curvature of the deflector edge portion, as measured in a longitudinal plane passing radially through a longitudinal axis of the engine, varies in a direction from one side of the reverse thrust opening to the opposite side of the opening. The curvature of the deflector edge portion is defined as being positive when the center of curvature of the deflector edge portion lies radially outwardly of the deflector and is defined as being negative when the center of curvature of the deflector edge portion lies radially inwardly of the deflector. The deflector edge portion may have a positive curvature adjacent to one side of the reverse thrust opening and a negative curvature adjacent to an opposite side of the reverse thrust opening such that the deflector edge defines a continuous smooth curve from one side of the reverse thrust opening to the other side.

The direction and the shape of the gases passing through the reverse thrust opening is controlled by varying the curvature of the deflector edge portion across the reverse thrust opening. The portion of the deflector edge having a positive curve of the smallest radius forms a maximum flow area, while the deflector edge portion having a negative curvature of the smallest radius forms a minimum flow area. Thus, by tailoring the curvature of the deflector edge portion to meet the requirements of a particular engine/aircraft application, the direction and shape of the gases passing through the reverse thrust opening can be controlled so as to minimize contact with the adjacent aircraft structure and to prevent reingestion of the thrust reverse gases into the turbofan engine.

The deflector edge portion between the deflector edge portions adjacent to opposite sides of the reverse thrust opening may have no curvature such that the deflector edge forms a continuous curve from one side of the reverse thrust opening to the other. Also, in a circumferential direction the deflector edge may lie in a plane extending generally perpendicular to the longitudinal axis of the housing, or may extend obliquely to such a plane.

BRIEF DESCRIPTION OF THE DRAWINGS

FIG. 3 is a partial, perspective view, similar to FIG. 2, illustrating a turbofan engine housing with the thrust reversing doors in their opened positions and incorporating the deflector according to the present invention.

FIGS. 3A-3D are cross sectional views taken along lines A—A, B—B, C—C and D—D in FIG. 3, respectively.

DETAILED DESCRIPTION OF THE PREFERRED EMBODIMENTS

Figure 1:
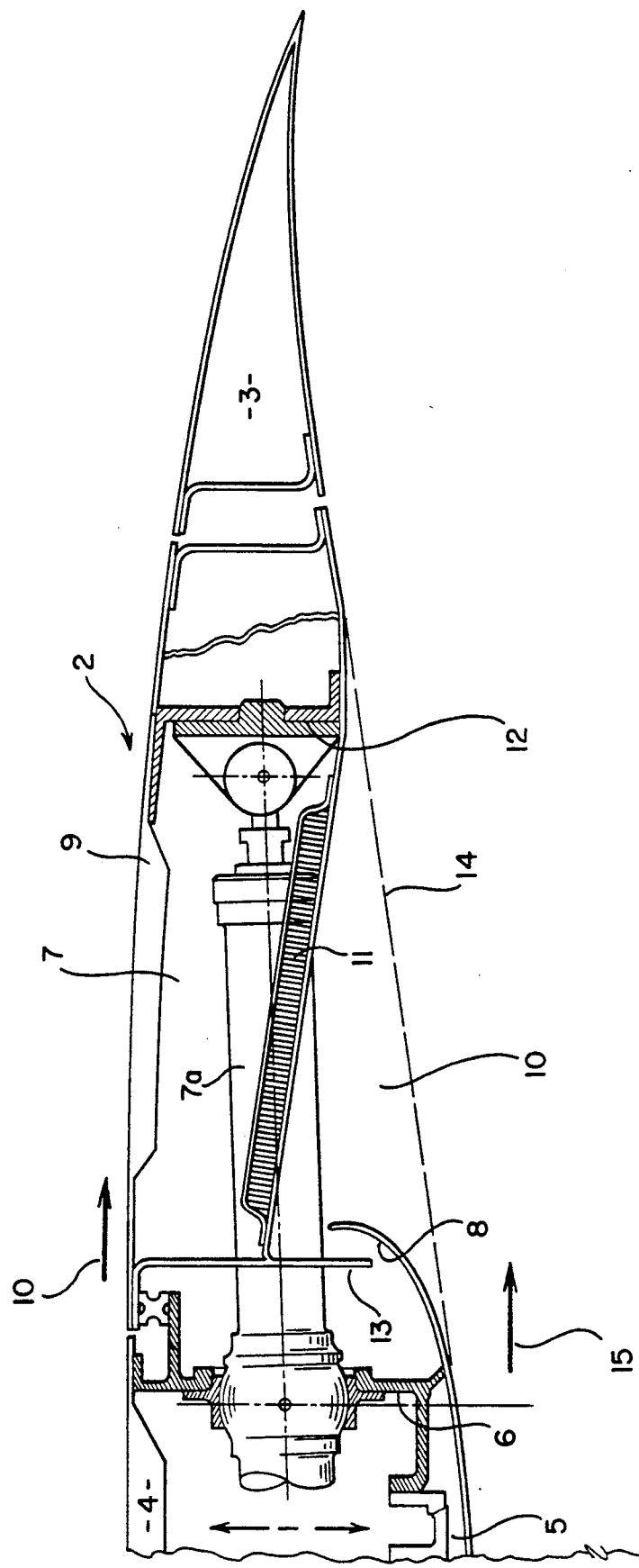
FIG. 1 is a partial, cross sectional view of a known pivoting door-type thrust reverser with the door in the closed, forward thrust position.
Figure 2:
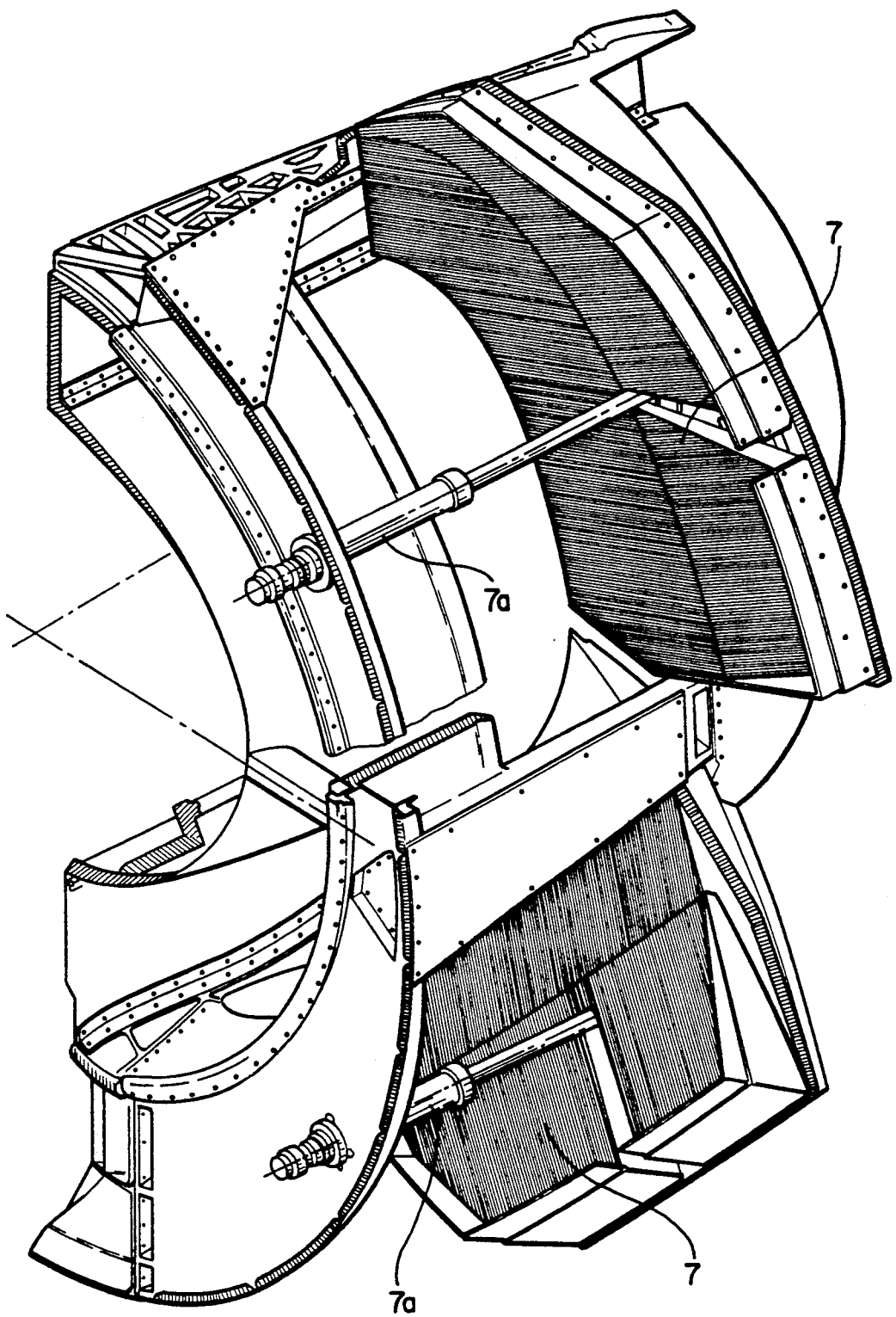
FIG. 2 is a partial, perspective view of a turbojet engine housing illustrating the thrust reverser doors of FIG. 1 in their opened, reverse thrust positions.
Figure 4:
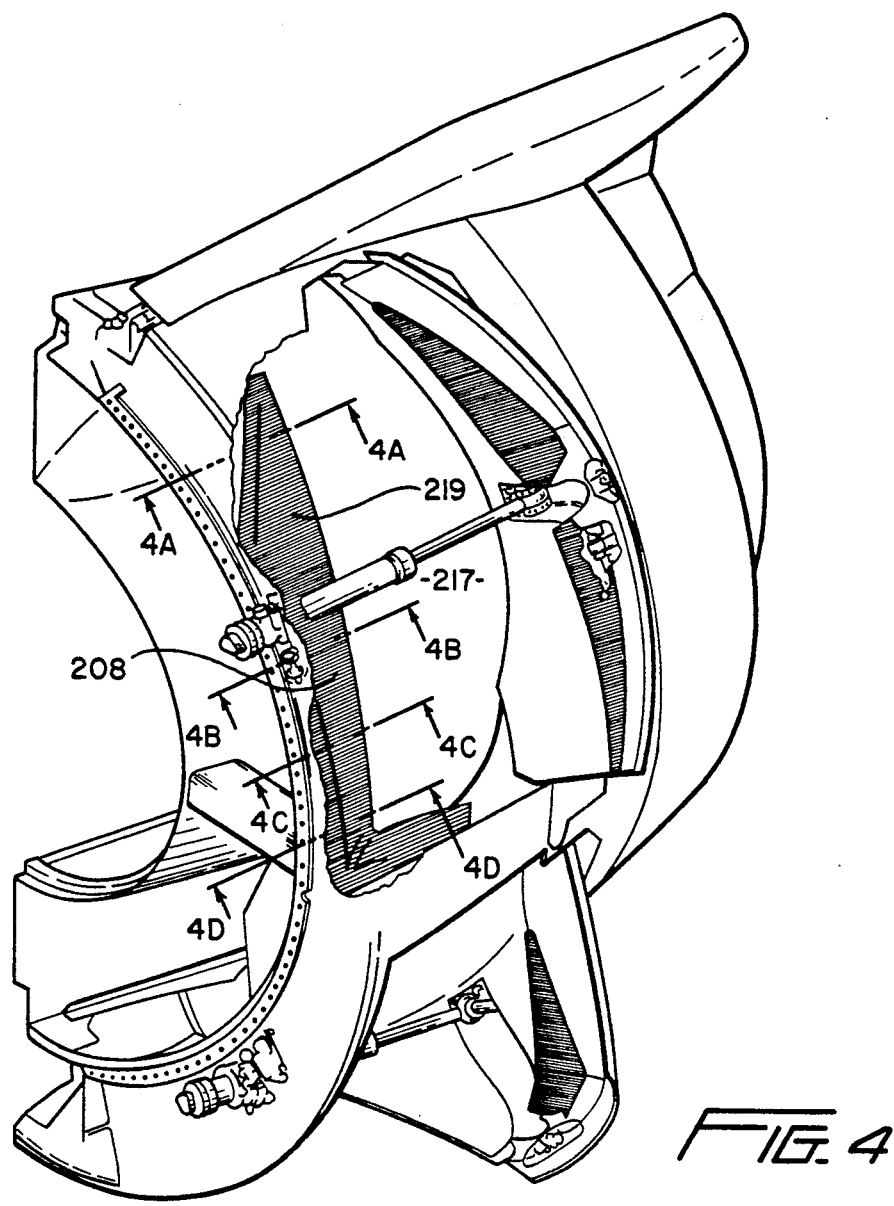
FIG. 4 is a partial, perspective view similar to FIG. 3 showing a second embodiment of the deflector according to the present invention.
Figure 4A:
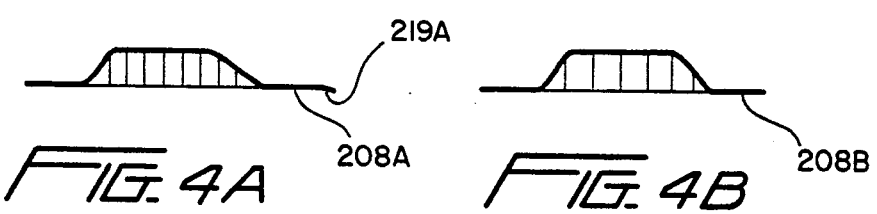
FIGS. 4A-4D are cross sectional views of the deflector edge taken along lines A—A, B—B, C—C, and D—D in FIG. 4, respectively.
Figure 4B:
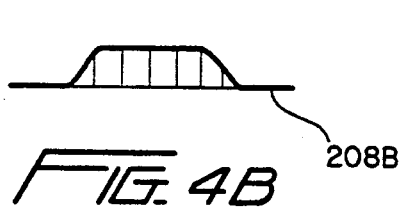
Figure 4C:
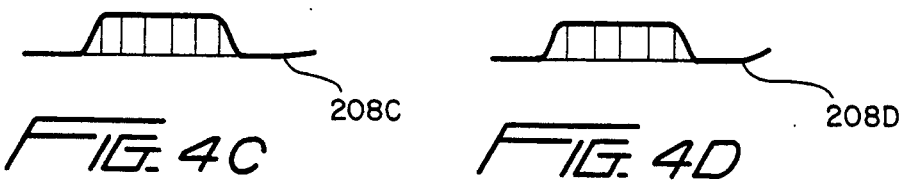
Figure 4D:
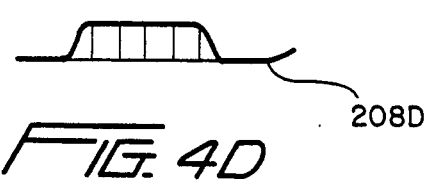

The deflector according to the present invention will be described in conjunction with a pivoting door-type thrust reverser. However, it is to be understood that the principles disclosed herein are equally applicable to other types of thrust reversers. The elements illustrated in FIGS. 3 and 4 which are similar to, or the same as, the known prior art pivoting door-type thrust reversers, illustrated in FIGS. 1 and 2, have been given the same identifying numerals as in FIGS. 1 and 2.

As can be seen in FIG. 3, the turbofan housing defines one or more reverse thrust openings 17 which may be displaced around the circumference of the turbofan housing. In known fashion, the reverse thrust opening 17 is closed by the thrust reverser door 7 when the door is in its forward thrust position so as to prevent gases in the cold flow air duct from passing through the reverse thrust opening. When the thrust reverser doors 7 are open, as illustrated in FIG. 3, the rear or downstream portion of the doors, in known fashion, block the cold flow air duct so as to direct the air through the reverse thrust openings 17.

The thrust reverser door forms a downstream boundary for the reverse thrust opening 17, which also has opposite sides defined by housing portion 18. The upstream boundary of the reverse thrust opening is defined by deflector 108 which is attached to the stationary upstream portion I of the turbofan engine housing.

In known fashion, the thrust reverser doors 7 may be equipped with door air deflectors 13 which impart a forward movement to the air passing outwardly through the reverse thrust openings 17.

The deflector 108 is designed to achieve maximum fluid flow through the reverse thrust openings 17 in order to ensure a high level of thrust reverser performance. The effectiveness of the deflector 108 arises in particular from the shape of the internal housing wall and by the curvature of a deflector edge portion taken in a longitudinal plane passing through the longitudinal axis of the housing and extending radially therefrom. The highest flow coefficients are achieved when the deflector edge portion 108 is curved, more particularly when the deflector edge portion has a positive curve (the center of curvature lying radially outwardly of the turbofan housing) such that the deflector edge portion appears concave when viewed from radially outwardly of the turbofan housing. However, the ideal curvature of the deflector is often inconsistent with the constraints imposed upon the deflector, such as weight and bulk, that effect the reverse thrust opening, thereby precluding the deflector front being formed in its optimal configuration. One of the objects of this invention is to arrive at an optimal tradeoff between these diverse constraints.

As shown in FIGS. 3A through 3D, the deflection edge portion 108 of the deflector according to this invention has a contour which varies in a circumferential direction, such that the curvature, measured in consecutive longitudinal planes extending radially from the longitudinal axis from one side of the reverse thrust opening to the other, varies. The curvature varies such that the deflector edge 19 defines a smooth, continuous curve from one side of the reverse thrust opening to the other.

Thus, at Section A—A, illustrated in FIG. 3A, the deflector edge portion 108A has a negative curvature (the center of curvature lies radially inwardly of the turbofan housing) such that the deflector edge forms a spoiler 19A which extends slightly into the cold flow air duct.

The Section B—B, taken near the circumferential center of the reverse thrust opening 17, illustrates that the deflector edge portion 108B has zero curvature and is essentially flat.

At the Section C—C, the deflector edge portion 108C has a very large radius of positive curvature (wherein the center of curvature lies radially outwardly of the turbofan housing). The radius of curvature becomes smaller as the deflector edge approaches the opposite side of the reverse thrust opening 17 such that, at Section D—D, adjacent to the opposite side, the deflector edge portion 108D is sharply curved, as illustrated in FIG. 3D. This area of sharpest curvature of the deflector edge portion 108 represents a maximum flow passage area through which the largest amount of air passing through the reverse thrust opening 17 will pass. The selected evolution of the curvature of the deflection edge portion 108 from one side of the reverse thrust opening to the other is determined in consideration of the imperatives of surface continuity and of the optimal control of the gases passing through the reverse thrust opening to achieve maximum overall performance. Thus, in the specific embodiment illustrated in FIGS. 3 and 3A-3D, there is an increase in the air flow through the reverse thrust opening 17 from the side near deflector edge portion 108A toward the deflector edge portion 108D adjacent to the opposite side of the reverse thrust opening defined by turbofan housing portion 18. In this particular embodiment, the deflector edge 19 lies in a plane extending perpendicular to the longitudinal axis of the turbofan engine housing.

A side fairing 20 may be added to the deflector edge portion 108, in known fashion, to improve the flow of the reverse thrust air and to reduce pressure drops. Other known design changes may be incorporated to accommodate for the closeness of the turbofan engine to either the ground or to other aircraft structure which would require special shaping of the air passing through the reverse thrust opening.

Among the known techniques for controlling the direction and shape of the gas passing through a reverse thrust opening, as illustrated in French Patent 2,599,838, is to orient the upstream boundary of the reverse thrust opening obliquely to a plane extending perpendicularly to the longitudinal axis of the engine. Such an orientation of the upstream boundary of the reverse thrust opening will provide complementary advantages when used in conjunction with the deflector edge illustrated in FIGS. 3 and 3A-3D. Accordingly, FIGS. 4 and 4A-4D illustrate a second embodiment of this invention in which the deflector edge 219 extends obliquely to a plane extending perpendicular to the longitudinal axis of the turbofan housing. The varying of the curvature of the downstream edge portion 208, as illustrated in FIGS. 4A-4D, is the same as in the previously described embodiment. Thus, deflection edge portion 208A has a negative curvature and defines a reduced airflow zone such that the deflector edge 219A forms a spoiler extending slightly inwardly into the cold flow air duct. Deflector edge portion 208B is generally flat and is followed by decreasing radius of curvature portions 208C and 208D, the latter forming the maximum flow area through the reverse thrust opening. As in the previously described embodiment, deflector edge 219 forms a continuous, smooth curve from one side of the reverse thrust opening to the other.

The foregoing description is provided for illustrative purposes only and should not be construed as in any way limiting this invention, the scope of which is defined solely by the appended claims.

We claim:

1. A thrust reverser for a turbojet engine assembly having a housing with a longitudinal axis and defining a gas flow duct comprising:
    a) a reverse thrust opening defined by the housing, the opening having opposite sides;
    b) door means operatively associated with the housing so as to be movable between a forward thrust position wherein the door means covers the reverse thrust opening thereby preventing gas in the gas flow duct from passing through the reverse thrust opening, and a reverse thrust position wherein the reverse thrust opening is opened so as to allow gas in the gas flow duct to pass through the reverse thrust opening; and
    c) a deflector having a deflector edge on a deflector edge portion defining an upstream boundary of the reverse thrust opening wherein curvature of the deflector edge portion, measured in a longitudinal plane extending along the longitudinal axis and passing through the reverse thrust opening varies from one side of the opening to the opposite side so as to control the direction of the gas emanating from the reverse thrust opening.

2. The thrust reverser of claim 1 wherein the deflector edge portion adjacent to one side of the reverse thrust opening has a first center of curvature located such that the deflector is positioned between the first center of curvature and the longitudinal axis.

3. The thrust reverser of claim 2 wherein the deflector edge portion adjacent to the opposite side of the reverse thrust opening has a second center of curvature positioned between the deflector and the longitudinal axis.

4. The thrust of claim 3 further comprising a deflector edge portion having a generally flat configuration located between the curved deflector edge portions adjacent to the opposite sides of the reverse thrust opening.

5. The trust reverser of claim 1 wherein the deflector edge is located in a transverse plane extending substantially perpendicular to the longitudinal axis.

6. The thrust reverser of claim 1 wherein the deflector edge extends obliquely to a transverse plane extending substantially perpendicular to the longitudinal axis.

7. The thrust reverser of claim 1 wherein the door means comprises a door pivotally attached to the housing.

8. The thrust reverser of claim 7 further comprising actuator means operatively associated with the door so as to move the door between its forward and reverse thrust positions.

* * * * *